Figure 7:
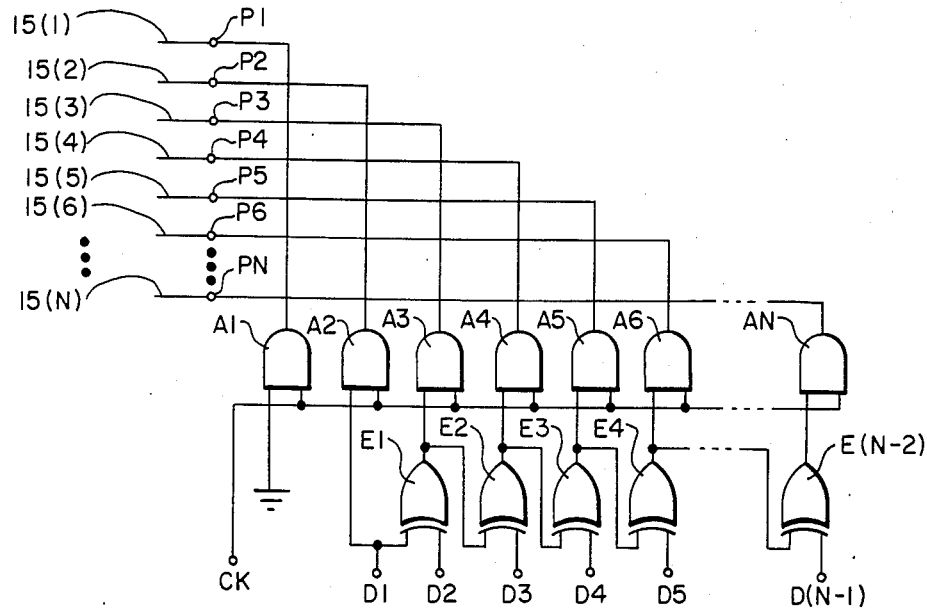

United States Patent [19]

Ishii et al.

[11] Patent Number: 4,695,847
[45] Date of Patent: Sep. 22, 1987

[54] METHOD AND APPARATUS FOR RECORDING

[75] Inventors: Hiroshi Ishii, Kashihara; Syunzi Nakai, Moriguchi; Yukihiro Mizumoto, Tenri, all of Japan

[73] Assignee: Sharp Kabushiki Kaisha, Osaka, Japan

[21] Appl. No.: 831,346

[22] Filed: Feb. 20, 1986

[30] Foreign Application Priority Data

Mar. 5, 1985 [JP] Japan .................................. 60-43281

[51] Int. Cl.$^4$ ...................... G01D 15/06; G01D 15/10
[52] U.S. Cl. ................................ 346/1.1; 346/76 PH; 400/120
[58] Field of Search ........................... 346/76 PH, 1.1; 400/120; 219/216

[56] References Cited

U.S. PATENT DOCUMENTS 3,719,261 3/1973 Heinzer ...................... 346/76 PH X
4,345,845 8/1982 Bohnhoff .................... 346/76 PH X
4,484,200 11/1984 Tabata ............................ 346/76 PH
4,556,892 12/1985 Erlichman ...................... 346/76 PH

OTHER PUBLICATIONS

Goff et al., Resistive Ribbon Energization Means Using Electroerosion Printhead, IBM TDB, vol. 27, No. 7B, Dec. 1984, p. 4486.

Primary Examiner—Joseph W. Hartary
Attorney, Agent, or Firm—Flehr, Hohbach, Test, Albritton & Herbert

[57] ABSTRACT

According to the recording technology of this invention, the recording sheet on a recording paper has two layers: a resistive layer and a thermally fusible solid ink layer. A plurality of needle electrodes are in contact with the recording sheet and a means is provided to cause electric currents to flow between selected pairs of mutually adjacent electrodes such that the ink layer is thermally fused for recording.

14 Claims, 13 Drawing Figures

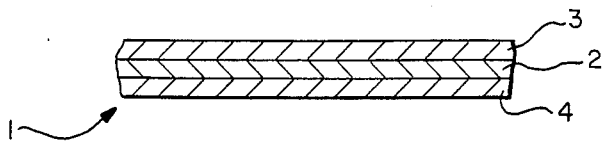
FIG. —1
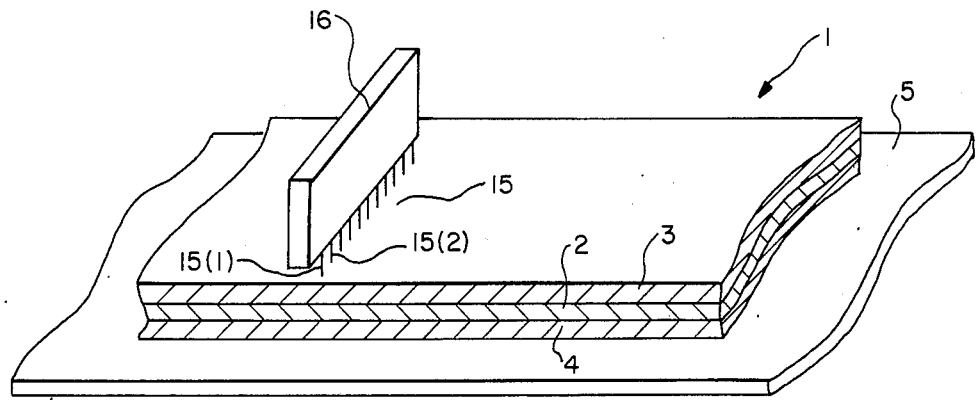
FIG. — 2
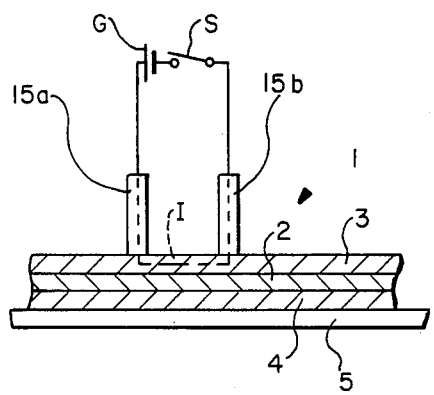
FIG. — 3
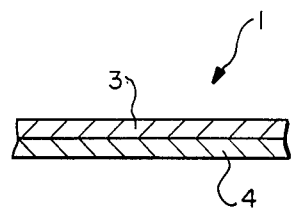
FIG. — 4

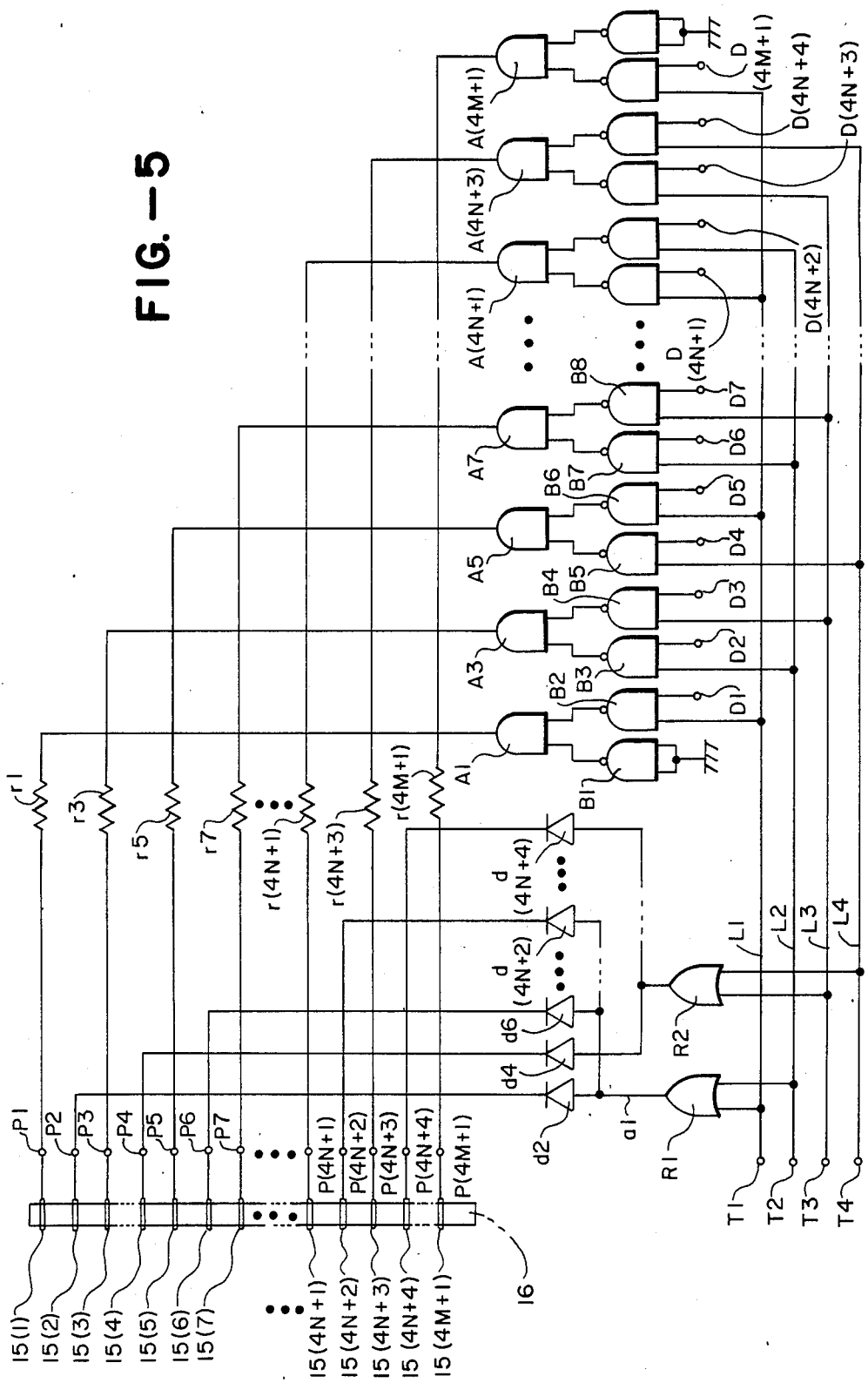
FIG.—5

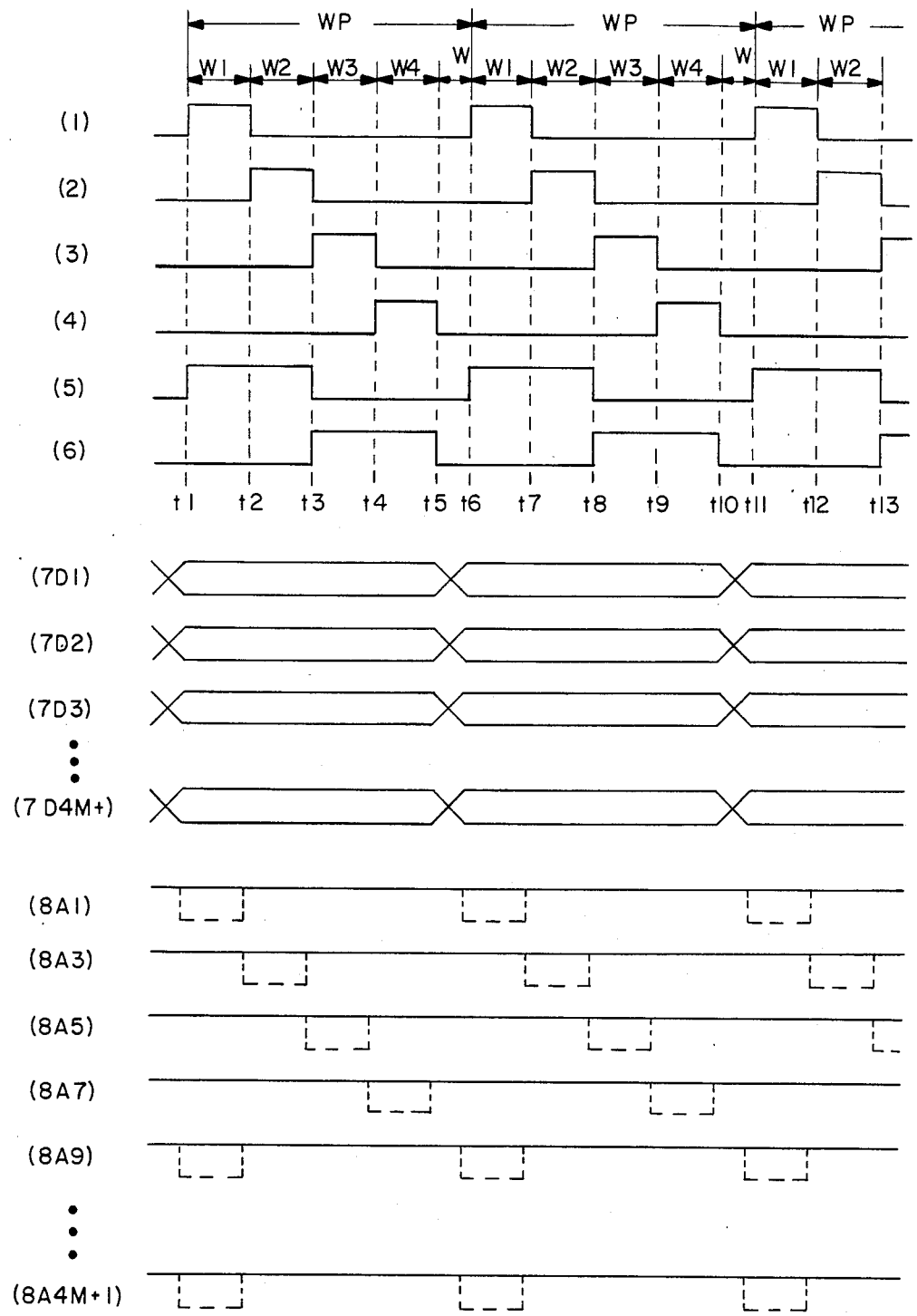
FIG. —6

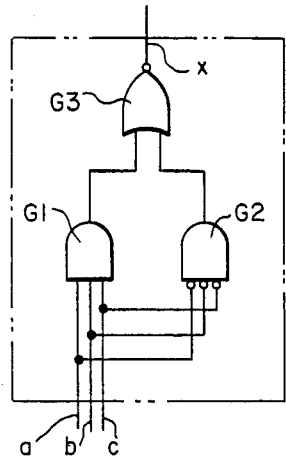
FIG.-10
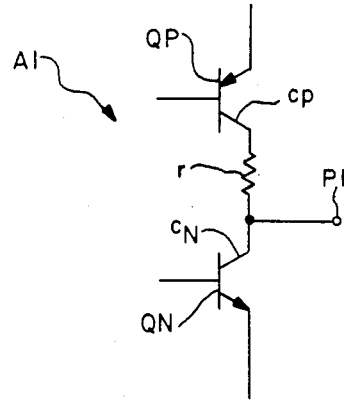
FIG.-11
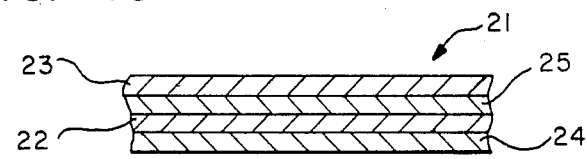
FIG.-12 <u>PRIOR ART</u>
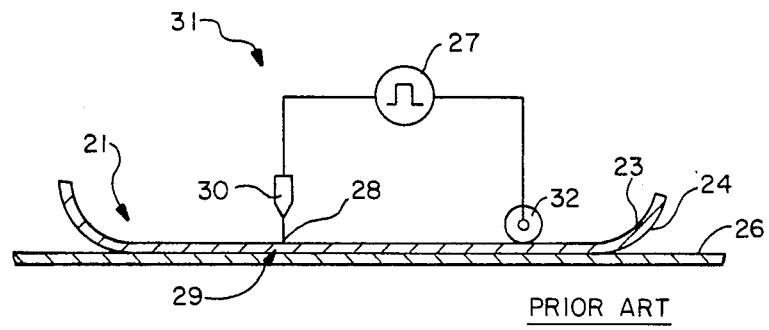
FIG.-13 <u>PRIOR ART</u>

METHOD AND APPARATUS FOR RECORDING

This invention relates to a method and apparatus for recording.

A typical example of prior art recording technology is shown in FIGS. 12 and 13. FIG. 12 is a cross-sectional view of a prior art recording sheet 21 to show its structure. A conductive layer 25 of aluminum is formed by vacuum vapor deposition on the front surface of a sheet-like substrate 22 comprising a film of an organic compound; a resistive layer 23 of carbon black and a synthetic resin material is formed on its upper surface; and a thermally fusible solid ink layer 24 is formed on the back surface of the aforementioned substrate 24.

A prior art technology for recording is explained by way of FIG. 13 which shows the solid ink layer 24 on the back surface of the recording sheet 21 in direct contact with a recording paper 26. A needle electrode 30 and a return electrode 32 are compressed against the front (or upper) surface of the recording sheet 21 and a driving power source 27 is connected between the needle electrode 30 and the return electrode 32, thus completing a closed circuit 31 (power source 27 - needle electrode 30 - resistive layer 23 - conductive layer (not shown) - return electrode 32 - power source 27). Thus, a recording current i will flow from the power source 27 with the help of the conductive layer and the return electrode 32 through the needle electrode 30 to its contact point 28 with the recording sheet 21. This cuases a localized heating of the resistive layer 23 where it touches the needle electrode 30, and the solid ink layer 29 becomes melted in the vicinity of the contact point 28. Dot recording is thus effected on recording paper.

In summary, it was necessary according to this prior art method to provide a return electrode in addition to a needle electrode and two electrical layers (a resistive layer and a conductive layer) had to be formed on a sheet-like substrate in order to allow a recording current to flow thereon. Thus, an increased cost was involved in forming two electrical layers and there were problems of missing dots caused by an imperfect contact by the return electrode and misprinting due to the heating at the contact point of the return electrode.

It is therefore an object of the present invention in view of the prior art technology described above to provide a recording method and apparatus for obtaining improved printing quality with no missing dots or misprinting even though use is made of recording sheets which can be manufactured at a low cost.

The above and other objects of the present invention are achieved by providing a new recording method according to which the recording sheet on the recording paper contains two layers, a resistive layer and a thermally fusible solid ink layer and use is made of a means for applying a potential difference between each of selected pairs of needle electrodes which are mutually insulated and in touch with the recording sheet on the recording paper such that electric currents will flow between such pairs of electrodes to thermally fuse the solid ink layer for recording.

Figure 8:
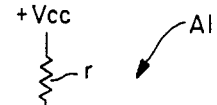
Figure 9:
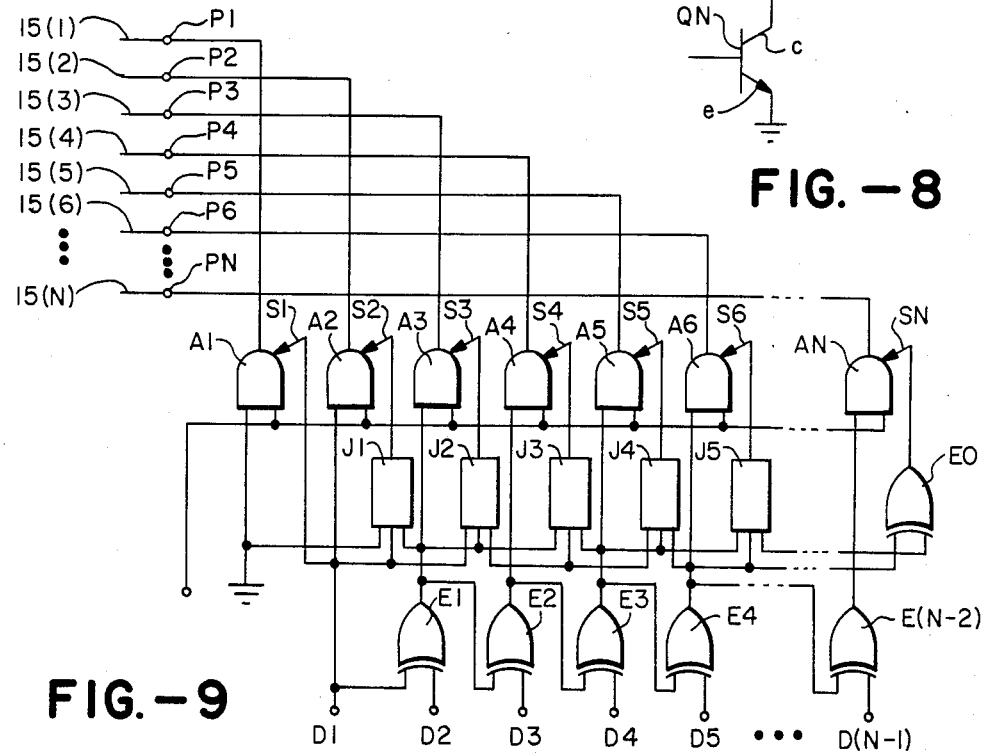

The accompanying drawings, which are incorporated in and form a part of the specification, illustrate embodiments of the present invention and, together with the description, serve to explain the principles of the invention. In the drawings:

FIG. 1 is a cross-sectional view of a recording sheet of the present invention to show its structure, FIG. 2 is a drawing for explaining a recording method embodying the present invention, FIG. 3 is a sectional view showing the recording method of FIG. 2, FIG. 4 is a sectional view of a recording sheet according to another embodiment of the present invention, FIG. 5 is a circuit diagram of a driving circuit for the needle electrodes embodying the present invention, FIG. 6 is a time chart for explaining the operation of the circuit of FIG. 5, FIG. 7 is a circuit diagram of a driving circuit for the needle electrodes according to another embodiment of the present invention, FIG. 8 is a circuit diagram showing the output stage of AND gates, FIG. 9 is a circuit diagram of a driving circuit for the needle electrodes according to still another embodiment of the present invention, FIG. 10 is a circuit diagram showing the structure of gates with three input terminals used in the circuit of FIG. 9, FIG. 11 is a circuit diagram of the output stage of AND gates in the circuit of FIG. 9, FIG. 12 is a cross-sectional view of a prior art recording sheet to show its structure, and FIG. 13 is a diagram showing a prior art recording technology by using the sheet shown in FIG. 12.

Reference being made to FIG. 1 which is a cross-sectional view of a recording sheet 1 of the present invention to show its structure, numeral 2 indicates a substrate made of a film of an organic compound, a resistive layer 3 of carbon black and a synthetic resin material is formed on one surface of the substrate 2, and a thermally fusible solid ink layer 4 (hereinafter referred to simply as the ink layer) is formed on the other surface.

FIG. 2 is a drawing for explaining a recording method embodying the present invention. The ink layer 4 formed on the surface of the recording sheet 1 facing a recording paper 5 is caused to make a firm contact with the paper 5 and a plurality of needle electrodes 15 disposed on a head 16 at fixed intervals and mutually insulated electrically are caused to touch the resistive layer 3 formed on the other surface of the recording sheet 1. The operations described above are further illustrated in FIG. 3 which shows a sectional view. A power source G becomes connected through a switch S to a pair of mutually adjacent needle electrodes 15a and 15b selected from the plurality of needle electrodes 15 disposed on the head (not shown in FIG. 3).

When the switch S is closed, a current I flows as shown by a broken line inside the resistive layer 3 between the needle electrodes 15a and 15b. The current I causes this portion of the resistive layer 3 to become locally heated and the heat thus generated is transferred to the ink layer 4 immediately below through the substrate 2. Solid ink in this part becomes melted and attached to the recording paper 5, thus completing the recording operation.

FIG. 4 is a sectional view of a recording sheet according to another embodiment of the present invention. This embodiment is very similar to the one shown by FIG. 1 and corresponding components are indicated by the same numerals. What is noteworthy about the recording sheet 1 of this embodiment is that the resistive layer 3 is made mechanically stronger so that a layer corresponding to the substrate layer of FIG. 1 can be dispensed with. Thus, FIG. 4 shows an ink layer 4 formed directly on the lower surface of the resistive layer 3 so that the heat transfer described above can be effected directly from the resistive layer 3 to the ink layer 4. This has the favorable effect of reducing the time required for melting the ink and clearer printing can be effected.

FIG. 5 is a circuit diagram of a driving circuit for the needle electrodes embodying the present invention. Numerals 15(1), 15(2), 15(3), . . . , 15(4N+1), 15(4N+2), 15(4N+3), 15(4N+4) and 15(4M+1) where N=0, 1, 2, 3, . . . and M=N+1 indicate needle electrodes which are mutually insulated from one another and disposed on the head 16 at uniform intervals. They are individually connected to contact terminals P1, P2, P3, . . . , P(4N+1), P(4N+2), P(4N+3), P(4N+4) and P(4M+1), respectively. Timing pulses derived from a source of driving power (not shown) by shift registers or the like are sequentially shifted and inputted to timing pulse input terminals T1, T2, T3 and T4. Lines L1, L2, L3 and L4 are respectively connected to these timing pulse input terminals T1, T2, T3 and T4.

A first OR gate R1 has one of its input terminals connected to the line L1 and the other input terminal to the line L2. A second OR gate R2 has one of its input terminals connected to the line L3 and the other input terminal to the line L4. A first NAND gate B1 has its two input terminals both grounded together and maintained at a low level. A second NAND gate B2 has one of its input terminals connected to the line L1 and the other input terminal to a recording input terminal D1. The output terminals of these two NAND gates B1 and B2 are respectively connected to the input terminals of a first AND gate A1 of which the output stage comprises an open collector NPN transistor with grounded emitter. A third NAND gate B3 has one of its input terminals connected to the line L2 and the other input terminal connected to a recording input terminal D2. A fourth NAND gate B4 has one of its input terminals connected to the line L3 and the other input terminal connected to a recording input terminal D3. The output terminals of these two NAND gates B3 and B4 are respectively connected to the two input terminals of a second AND gate A3. Terminals of the subsequent NAND and AND gates are similarly connected and the two input terminals of the last NAND gate B(4M+2) are both grounded together and maintained at a low level.

Needle electrodes 15(2), 15(4), 15(6), . . . , 15 (4N+2) and 15 (4N+4) are hereinafter identified as anode needle electrodes. They are divided into two groups, the first group consisting of 15(2), 15(6), 15(10), . . . , 15 (4N+2) with four-dot intervals between them and the second group consisting of 15(4), 15(8), 15(12), . . . , 15(4M+4) likewise with four-dot intervals between them. In other words, anode needle electrodes belonging to the same group are arranged at uniform four-dot intervals.

The anode of diodes d2, d6, d10, . . . , d(4N+2) are connected together to the output terminal of the first OR gate R1 through a line a1. Their cathodes are connected respectively to the anode needle electrodes 15(2), 15(6), 15(10), . . . , 15 (4N+2) through terminals P2, P6, P10, . . . , P (4N+2). The anodes of diodes d4, d8, d12 . . . , d (4N+4) are connected together to the output terminal of the second OR gate R2 through a line a2. Their cathodes are connected respectively to the anode needle electrodes 15(4), 15(8), 15(12), . . . , 15 (4N+4) through terminals P4, P8, P12, . . . , P (4N+4). Accordingly, the anode needle electrodes comprising the aforementioned first group belong to the first OR gate R1 and the anode needle electrodes comprising the aforementioned second group belong to the second OR gate R2.

The output terminal of the first AND gate A1 is connected to a cathode needle electrode 15(1) through a resistor r1 and a terminal P1. The output terminal of the second AND gate A3 is connected to a cathode needle electrode 15(3) through a resistor r3 and a terminal P3. The output terminals of the subsequent AND gates are similarly connected and the output terminal of the (2M+1)st AND gate A(4M+1) is connected to a cathode needle electrode 15 (4M+1) through a resistor r (4M+1) and a terminal P (4M+1). In the above, the resistors r1 - r (4M+1) are provided, as will be explained in detail below, for the purpose of limiting the stray currents from the other needle electrodes.

FIG. 6 is a time chart for explaining the operation of the circuit of FIG. 5 for driving the needle electrodes. Signal levels in FIG. 6 are displayed simply in terms of high levels (H) and low levels (L). Reference being made concurrently to FIGS. 5 and 6, (1) in FIG. 6 represents the waveform of the timing pulse inputted to the line L1 from the power source circuit (not shown in FIG. 5) through the power input terminal T1. This pulse is inputted during a time interval W1 from t1 to t2. Similarly, (2) in FIG. 6 is a waveform of the timing pulse which is inputted to the line L2 from the power input terminal T2 during a time interval W2 from t2 to t3; (3) in FIG. 6 is the waveform of the timing pulse which is inputted through the power input terminal T3 during a time interval W3 from t3 to t4; (4) in FIG. 6 is the waveform of the timing pulse which is inputted to the line L4 during a time interval W4 from t4 to t5. There is no timing pulse during a subsequent time period ΔW from t5 to t6. At time t6, another cycle of pulses is inputted, starting from the condition at t1, that is, a timing pulse is inputted then to the line L1, to the line L2 at t7, and so on sequentially shifted and inputted to the lines L1 through L4.

The corresponding output waveform from the first OR gate R1 when timing pulses are inputted through the lines L1 and L2 is shown by (5) in FIG. 6. This waveform is outputted during the time interval W1+W2. The corresponding output waveform from the second OR gate R2 when timing pulses are inputted through the lineS L3 and L4 is shown by (6) in FIG. 6. This waveform is outputted during the time interval W3+W4. The waveform of the output signal inputted to the recording input terminal D1 is shown by (7D2) in FIG. 6, that inputted to the recording input terminal D3 is shown by (7D3) in FIG. 6, and that inputted to the recording input terminal D (4M+1) is shown by (7D4M+1) in FIG. 6. The waveform which appears at the output terminal of the first AND gate A1 is shown by (8A1) in FIG. 6. The broken lines indicate that the output from the first AND gate is at a low level during the time interval W1 when the line L1 is at a high level and the recording input terminal D1 is also at a high level. The waveform which appears at the output terminal of the second AND gate A3 is shown by (8A3) in FIG. 6. The broken lines indicate that the output from the second AND gate is at a low level during the time interval W2 when the line L2 is at a high level and the recording input terminal D2 is also at a high level. The waveforms which appear at the output terminals of the other AND gates are similarly indicated. Thus, the waveform which appears at the output terminal of the fifth AND gate A9 is shown by (8A5) in FIG. 6 and the waveform which appears at the output terminal of the (2M+1) st AND gate A (4M+1). The broken lines indicate that the output from this AND gate is at a low level during the time interval W1 when the line L1 is at a high level and the recording input terminal D (4M+1) is also at a high level.

Next, the operation according to this embodiment of the present invention will be explained with reference to FIGS. 5 and 6. During the first time interval W1, timing pulse is inputted to the line L1. Thus, the line L1 is at a high level and the other lines L2–L4 are at low levels. Let us consider a situation now where a high-level input signal is inputted only to the recording input terminal D2, D3, . . . , D (4M+1) are at low levels. In this situation, the output terminal of the first OR gate is at a high level, the output terminal of the second OR gate is at a low level, the line a1 is at a high level and the line a2 is at a low level. In this situation, therefore, high-level voltages are inputted to the aforementioned anode needle electrodes 15(2), 15(6), 15(10), . . . , 15(4N+2) belonging to the first OR gate R1 respectively through the diodes d2, d6, d10, . . . , d(4N+2) and the anode needle electrodes 15(4), 15(8), 15(12), . . . , 15(4N+4) belonging to the second OR gate come to be in floating conditions through the diodes d4, d8, d12, . . . , d(4N+4). In the meantime, since the two input terminals of the first NAND gate B1 are both at a low level, its output is at a high level. One of the input terminals of the second NAND gate is at a high level, being connected to the line L1, and the other input terminal is at a high level then, being connected to the recording input terminal D1. Thus, the output of the second NAND gate is at a low level. These outputs of the two NAND gates B1 and B2 are inputted to the first AND gate A1 and its output becomes low. This puts the cathode needle electrode 15(1) at a low level and a current flows through the resistive layer (not shown in FIGS. 5 and 6) from the adjacent anode needle electrode 15(2), heating this portion of the resistive layer to effect the aforementioned recording operation. In the situation described above, there are other anode needle electrodes (15(6), 15(10), . . . ) besides the one (15(2)) adjacent to the cathode needle electrode 15(1) which are also at a high level but the resistor r1 connected to this cathode needle electrode 15(1) serves to limit the current flowing into the cathode needle electrode 15(1) to a fixed value. In view additionally of their relative distances to the cathode needle electrode 15(1), therefore, stray currents from electrodes other than the adjacent anode needle electrode 15(2) become limited and misprinting can thus be prevented. Although the anode needle electrode 15(4) belonging to the second OR gate R2 is positioned between the anode needle electrodes 15(2) and 15(6), there is no current flowing from it because it is in a floating condition as explained above. In addition, the diode d4 serves to prevent any reverse current.

In the above, we considered a situation where a high-level input signal is inputted to only one recording input terminal D1 during the time interval W1. If a high-level input signal is inputted to a plurality of recording input terminals D within a same time interval, however, there result a plurality of pairs of anode and cathode needle electrodes. Operations described above are similarly effected in subsequent time intervals W2, W3, and W4.

According to this embodiment, therefore, timing pulses are used to drive needle electrodes according to time partitions, forming pairs of electrodes corresponding to the areas where input signals are inputted for recording at points separated by four dots. Resistors are provided to limit stray currents and diodes are used to prevent reverse currents and hence to prevent misprinting.

FIG. 7 is a circuit diagram of a driving circuit for the needle electrodes according to another embodiment of the present invention. This embodiment is characteristic in that anode and cathode needle electrodes are not definitely assigned but that a potential difference is caused between adjacent needle electrodes corresponding to the region where a recording input signal is inputted. The recording timing according to this embodiment is set by one-bit clock signals CK. Needle electrodes 15(1)–15(N) are individually connected through terminals P1-PN to the output terminals of AND gates A1-AN (N representing the total number of the needle electrodes). The output stage of each of these AND gates A1-AN comprises, as shown in FIG. 8, a NPN type transistor with grounded emitter and a resistor r as collector load such that the recording current can be maintained at a constant level and to prevent stray currents.

Reference being made again to FIG. 7, one of the input terminals of each of the AND gates A1-AN are connected together to the clock signal input terminal CK. The other input terminal of the first AND gate A1 is grounded and is maintained at a low level. The other input terminal of the second AND gate A2 is connected to a recording input terminal D1 and further to one of the input terminals of a first EX OR gate E1. The other input terminal of the third AND gate A3 is connected to the output terminal of the first EX OR gate E1 and one of the input terminals of a second EX OR terminal E2. The other input terminal of the second EX OR gate is connected to a recording input terminal D2. Cascade connections of other AND and EX OR gates are effected similarly, the other input terminal of the final EX OR gate E(N−2) being connected to a recording input terminal D(N−1) and its output terminal being connected to the other input terminal of the final AND gate AN. Thus, the total number of the recording input terminals indicated by D (D1-D(N−1) is less than that of the needle electrodes (15(1)-15(N)). This is because, for example, a current will flow between the needle electrodes 15(1) and 15(2) if the recording input terminal D1 is specified, between the needle electrodes 15(3) and 15(4) if the recording input terminal D3 is specified, and so forth.

Table 1, in which H and L respectively indicate a high level and a low level, shows all combinations of data input signals that can be given to the recording input terminals D1-D(N−1) when the clock signal CK of FIG. 7 is at a high level and the levels which appear correspondingly at the needle electrodes. The third line of Table 1, for example, relates to a situation where the second recording input terminal D2 alone is at a high level while the other recording input terminals D1, D3-D(N−1) are at low levels, and shows for this situation that the only adjacent pair of needle electrodes which are not both at high levels or at low levels is the electrodes 15(2) and 15(3), causing a current to flow from the needle electrode 15(3) at a high level to the needle electrode 15(2) at a low level. In short, recording is effected by specifying the recording input terminal D2. As another example, the eighth line (No. 8) of Table 1 relates to a situation where three recording input terminals D1, D2 and D3 are specified (at high levels) and shows for this situation that the three pairs of adjacent needle electrodes in the section between the electrodes 15(1) and 15(4) are all in a condition to pass a current. This means that recording is effected in the section from the electrode 15(1) through the electrodes 15(3) and 15(3) to the electrodes 15(4) by specifying the recording input terminals D1, D2 and D3.

TABLE 1

| No. | Recording Input Terminals | | | | | | Needle Electrodes | | | | | | |
|---|---|---|---|---|---|---|---|---|---|---|---|---|---|
| | D1 | D2 | D3 | D4 | ... | D(N − 1) | 15(1) | 15(2) | 15(3) | 15(4) | 15(5) | ... | 15(N) |
| 1 | L | L | L | L | ... | L | L | L | L | L | L | ... | L |
| 2 | H | L | L | L | ... | L | L | H | H | H | H | ... | H |
| 3 | L | H | L | L | ... | L | L | L | H | H | H | ... | H |
| ... | ... | ... | ... | ... | ... | ... | ... | ... | ... | ... | ... | ... | ... |
| 7 | L | H | H | L | ... | L | L | L | H | L | L | ... | L |
| 8 | H | H | H | L | ... | L | L | H | L | H | H | ... | H |
| ... | ... | ... | ... | ... | ... | ... | ... | ... | ... | ... | ... | ... | ... |
| $2^N$ | H | H | H | H | ... | H | L | H | L | H | L | ... | * |

Note: "*" indicates H when N is even and L when N is odd.

FIG. 8 is a circuit diagram showing the output stage of the aforementioned AND gates A1-AN comprising an NPN type transistor QN of which the emitter e is grounded and maintained at a low level and the collector C is subjected to a source voltage $+V_{CC}$ through a resistor r, the corresponding terminal (P1, for example) being connected to the collector C. The resistor r serves to stabilize the recording current and limit the stray currents from electrodes which were not specified, thereby preventing misprinting.

In summary, the speed of recording can be improved according to this embodiment of the present invention because misprinting can be prevented without increasing the recording time by applying potential differences to the desired pairs of adjacent needle electrodes and setting all other electrodes at same potential levels and also because printing operations are effected at specified sections by each pulse of the clock signal CK.

FIG. 9, which is similar to FIG. 7 and hence uses the same letter and number symbols as used in FIG. 7, is a circuit diagram of a driving circuit for the needle electrodes according to still another embodiment of the present invention. One unique feature of this embodiment is that strobe inputs S are applied to the AND gates A1-AN which drive the individual needle electrodes 15(1)-15(N) such that when a strobe input is at a low level, the needle electrode connected to the output terminal of the corresponding AND gate will be put in a floating condition. Another unique feature is that when a low level input is given continuously to some of the recording input terminals D1-DN, or when adjacent pairs of needle electrodes are at the same level, these electrodes are all put in a floating condition such that stray currents will be prevented.

In FIG. 9, each of the gates J1, J2, ..., J(N−2) (N being again the total number of the needle electrodes) is a circuit for generating strobes, having three input terminals a, b and c as shown in FIG. 10. The first input terminal of the first gate J1 is grounded and maintained at a low level. Its second input terminal is connected to the recording input terminal D1, the first input terminal of the second gate J2 and one of the input terminals of the second AND gate A2. The third input terminal of the first gate J1 is connected to the output terminal of the first EX OR gate E1, the second input terminal of the second gate J2 and one of the input terminals of the third AND gate A3. The second input terminal of the second gate J2 is connected to the first input terminal of the third gate J3, its third input terminal is connected to the second input terminal of the third gate J3 and the first input terminal of the fourth gate J4, and so on. The strobe terminals S1-SN of the AND gates A2-AN are respectively connected to the output terminals of the gates J1-J(N−2) and an EX OR gate EO.

FIG. 10 is a circuit diagram showing the structure of the gate J1 with three input terminals, the gates J2-J(N−2) being similarly constructed. As shown therein, the gate J1 comprises a three-input AND gate G1, three-reverse-input AND gate G2 an a NOR gate G3. The three input terminals of the gate J1 are indicated by a, b and c and its output terminal is indicated by X. The truth table of the gate J1 is shown in Table 2.

TABLE 2

| a | b | c | X |
|---|---|---|---|
| L | L | L | L |
| L | L | H | H |
| L | H | L | H |
| L | H | H | H |
| H | L | L | H |
| H | L | H | H |
| H | H | L | H |
| H | H | H | L |

As shown in Table 2, the gates J1-J (N−2) each function as a three-input EX OR gate.

FIG. 11 is a circuit diagram of the output stage of the first AND gate A1 in the circuit of FIG. 9. The other AND gates A1-AN are similarly structured. As shown in FIG. 11, the output stage of the first AND gate A1 forms a totem pole circuit with a PNP type transistor QP and a NPN type transistor QN, the collector $C_P$ of the transistor QP and the collector $C_N$ of the transistor QN being connected to each other through a resistor r. The collector $C_N$ of the transistor QN is connected to the connection terminal P1. The resistor r serves to stabilize the recording current.

Reference being made again to FIG. 9, let us consider next a situation where inputs shown on the third row (No. 3) of Table 1 have been applied to the recording input terminals D1-D (N−1) according to a certain timing. Since FIG. 9 is identical to FIG. 7 except for the strobe circuits, the levels of the needle electrodes 15(1)-15(N) are also nearly as shown on the third row (No. 3) of Table 1 but since strobe circuits have been added, some of them are in a floating condition. Reference being additionally made to Table 1 with respect to the situation now under consideration, since the recording input terminal D1 is at a low level, the strobe terminal S1 is also at a low level. Thus, the output terminal of the AND gate A1, and hence the needle electrode 15(1), is maintained in a floating condition. Next, since the recording input terminal D2 is at a high level, the output terminal of the EX OR gate E1 is at a high level. This puts the three input terminals at low, low and high levels so that its output, hence the strobe terminal S2 becomes high and the output of the second AND gate becomes low according to Table 2. Next, since the recording input terminal D3 is at a low level, the output from the EX OR gate E2 is high and since the input terminal D4 is at a low level, the output from the EX OR gate E3 is high. Likewise, the outputs of all the other EX OR gates E4–E(N−2) are high because the input terminals D5–D(N−1) are low. Thus, the inputs to the three-input gate J2 are low, high and high so that its output, and hence the strobe terminal S3 becomes high. Thus, the level of the output terminal of the third AND gate A3, and hence the level of the needle electrode 15(3) becomes high. Since the inputs to the next three-input gate J3 are high, high and high, its output is low. for the remaining gates J4–J(N−2), the outputs are all low. Thus, the outputs of the AND gates A4–AN, and hence the needle electrodes 15(4)–15(N) all become floating. This result is summarized in Table 3. The upper level on the right-hand side shows the levels according to Table 3 and the lower level shows the results according to this embodiment. In Table 3, x indicates that the needle is in a floating condition.

TABLE 3

| | Recording Input Terminals | | | | | Needle Electrodes | | | | | |
|---|---|---|---|---|---|---|---|---|---|---|---|
| No. | D1 | D2 | D3 | D4 ... | D(N − 1) | 15(1) | 15(2) | 15(3) | 15(4) | 15(5) ... | 15(N) |
| 3 | L | H | L | L ... | L | L | L | H | H | H ... | H |
| | | | | | | X | L | H | X | X ... | X |

Table 3 can be extended easily to situations other than No. 3 of Table 1. According to this embodiment, in summary, strobe terminals S are provided to the AND gates A1–AN and use is made of the three-input gates J1–J(N−2) and the FX OR gate EO to control the levels of the strobe terminals S1–SN by selecting only those specific adjacent pairs of needle electrodes necessary for the printing operation on the basis of the data (high or low) at the recording input terminals D1–D(N−1) so that a recording current will flow only in the sections between them and the other needle electrodes will be floating, thus preventing the generation of stray currents.

This invention teaches the forming of recording sheets with only two layers (a resistive layer and a thermally fusible solid ink layer). This reduces the production cost and improves productivity. Moreover, since no return electrode of the type employed in prior art systems is required, omissions of dots and misprints caused thereby can be prevented and hence the quality of printed characters can be improved. Since adjacent pairs of needle electrodes are selected to pass recording currents between them so that stray currents from the other electrodes are blocked, problems caused by such stray currents can also be eliminated.

The foregoing description of the embodiments of this invention has been presented for purposes of illustration and description. It is not intended to be exhaustive or to limit the invention to the precise form disclosed, and obviously many modifications and variations are possible in light of the above teaching. The embodiments presented above were chosen and described in order to best explain the principles of the invention and its practical application to thereby enable others skilled in the art to best utilize the invention in various embodiments and with various modifications as are suited to the particular use contemplated.

What is claimed is:

1. A recording method comprising the steps of
   causing a recording sheet to exist between a plurality of electrically conductive needle electrodes and a recording paper, said recording sheet being in contact with said electrodes and having a thermally fusible solid ink layer and a resistive layer, said solid ink layer facing said recording sheet, said needle electrodes being mutually insulated electrically, and
   applying a variable potential difference between each of selected pairs of said electrodes for thermal fusion of said solid ink layer and transfer onto said recording paper.

2. The recording method of claim 1 wherein said selected pairs of electrodes are adjacent to each other.

3. The method of claim 1 further comprising the step of keeping in a floating condition those of said electrodes which are not selected in said step of applying a potential.

4. The method of claim 1 wherein said step of applying a potential comprises outputting signals from data input terminals individually corresponding to said selected pairs.

5. The recording method of claim 1 further comprising the step of providing resistors to stabilize current caused by said potential difference.

6. An apparatus for recording by applying potential differences between pairs of selected two points, comprising
   a plurality of needle electrodes which are insulated with respect to one another, and
   a needle driving means for causing a variable potential difference to appear between each of selected pairs of said needle electrodes.

7. The apparatus of claim 6 wherein the electrodes of each of said selected pairs are disposed adjacent to each other.

8. The apparatus of claim 7 further comprising a plurality of input terminals each of which serves to select a mutually adjacent pair from said plurality of electrodes.

9. The apparatus of claim 7 further comprising AND gates with output terminals connected individually to at least a portion of said electrodes.

10. The apparatus of claim 9 wherein the output stage of each of said AND gates includes a resistor which serves to stabilize current flowing therethrough.

11. The apparatus of claim 9 further comprising strobe signal generating circuits, the outputs from said strobe signal generating circuits being adapted to be inputted individually to said AND gates.

12. The apparatus of claim 11 wherein said strobe generating circuits each serve to put in floating condition the electrode which is connected to the corresponding one of said AND gates.

13. The apparatus of claim 11 wherein said strobe generating circuits serve to function as EX OR gates each with three inputs.

14. The apparatus of claim 6 wherein said needle driving means operates to apply either high potential or low potential to each of said electrodes, applying same potential to each of said pairs if no recording is desired therebetween and applying mutually different potential to each of said pairs if recording is desired therebetween.

* * * * *